US009226573B2

(12) United States Patent
Glenn, II

(10) Patent No.: US 9,226,573 B2
(45) Date of Patent: Jan. 5, 2016

(54) BRACKET FOR SECURING ITEMS OF FURNITURE WITHOUT TOOLS OR FASTENERS

(71) Applicant: Mayline Company LLC, Sheboygan, WI (US)

(72) Inventor: Robert J. Glenn, II, Chicago, IL (US)

(73) Assignee: Mayline Company LLC, Sheboygan, WI (US)

( * ) Notice: Subject to any disclaimer, the term of this patent is extended or adjusted under 35 U.S.C. 154(b) by 176 days.

(21) Appl. No.: 13/829,390

(22) Filed: Mar. 14, 2013

(65) Prior Publication Data

US 2013/0330123 A1 Dec. 12, 2013

Related U.S. Application Data

(60) Provisional application No. 61/658,256, filed on Jun. 11, 2012.

(51) Int. Cl.
*A47B 81/00* (2006.01)
*A47B 97/00* (2006.01)
(Continued)

(52) U.S. Cl.
CPC ............... *A47B 13/00* (2013.01); *A47B 83/001* (2013.01); *F16B 12/00* (2013.01); *A47B 2021/064* (2013.01); *A47B 2021/066* (2013.01); *A47B 2097/003* (2013.01); *Y10T 403/64* (2015.01)

(58) Field of Classification Search
CPC ..... Y10T 403/64; F16B 12/00; A47B 83/001; A47B 2021/064; A47B 2021/066; A47B 2097/003
USPC ......... 403/187, 231, 291, 335–338, 353, 403; 248/220.21, 220.22, 223.41; 108/50.01, 50.02; 312/223.6, 223.3, 312/263; 52/36.5, 665.1, 712, 715
See application file for complete search history.

(56) References Cited

U.S. PATENT DOCUMENTS 3,018,526 A * 1/1962 Riebel ............................ 403/187
3,398,981 A * 8/1968 Vincens ........................ 403/388
(Continued)

FOREIGN PATENT DOCUMENTS

WO    WO 2011141301 A2 * 11/2011

OTHER PUBLICATIONS

Product Brochure: Steelcase Montage Solutions [online]. Steelcase Inc., Mar. 2012 [retrieved on Dec. 16, 2013]. Retrieved from the Internet: <http://www.steelcase.com/en/products/category/workspace/panel/montage/documents/montagebrochure_ncemail.pdf> (11 pages).

*Primary Examiner* — Gregory Binda
*Assistant Examiner* — Nahid Amiri
(74) *Attorney, Agent, or Firm* — Nixon Peabody LLP

(57) ABSTRACT

A system for assembling furniture includes a bracket coupled to a first item and a frame coupled to a second item of furniture. The bracket is configured to removably interengage with the frame. The bracket includes a pair of co-planar extensions, a pair of supports, and an elongated resilient bent middle section having a length dimension that is longer than a length dimension of each of the extensions such that end tab portions of the bent middle section extend beyond the supports. The frame includes a pair of rails, each rail having a recess and a flange. The recess receives respective ones of the end tab portions. The flange receives respective ones of the end tab portions responsive to the middle section being urged from the recess into the flange to cause the bent middle section to deform into an interference fit engagement with the flange.

25 Claims, 10 Drawing Sheets

(51) Int. Cl.
*A47B 13/00* (2006.01)
*F16B 12/00* (2006.01)
*A47B 83/00* (2006.01)
*A47B 21/06* (2006.01)

(56) References Cited

U.S. PATENT DOCUMENTS

| | | | |
|---|---|---|---|
| 3,530,996 A * | 9/1970 | Schaffer | 211/107 |
| 3,940,212 A | 2/1976 | Gutner | |
| 4,898,355 A * | 2/1990 | Steinway | 248/235 |
| 5,244,186 A * | 9/1993 | Chandler | 256/65.07 |
| 5,406,760 A | 4/1995 | Edwards | |
| 5,437,426 A | 8/1995 | MacDonald | |
| 5,536,078 A * | 7/1996 | Novikoff | 312/195 |
| 5,636,820 A | 6/1997 | Domenig | |
| 5,813,178 A | 9/1998 | Edwards | |
| 5,899,025 A | 5/1999 | Casey et al. | |
| 6,112,472 A | 9/2000 | Van Dyk et al. | |
| 7,908,805 B2 | 3/2011 | Metcalf et al. | |
| 8,074,422 B2 * | 12/2011 | O'Neil et al. | 52/700 |
| 8,146,229 B2 | 4/2012 | Henriott et al. | |
| 2007/0063118 A1* | 3/2007 | Owens et al. | 248/300 |
| 2009/0190996 A1* | 7/2009 | Clarke | 403/188 |
| 2010/0196088 A1* | 8/2010 | Johnsson | 403/291 |
| 2011/0255915 A1 | 10/2011 | Chen et al. | |
| 2013/0327256 A1 | 12/2013 | Glenn | |

* cited by examiner

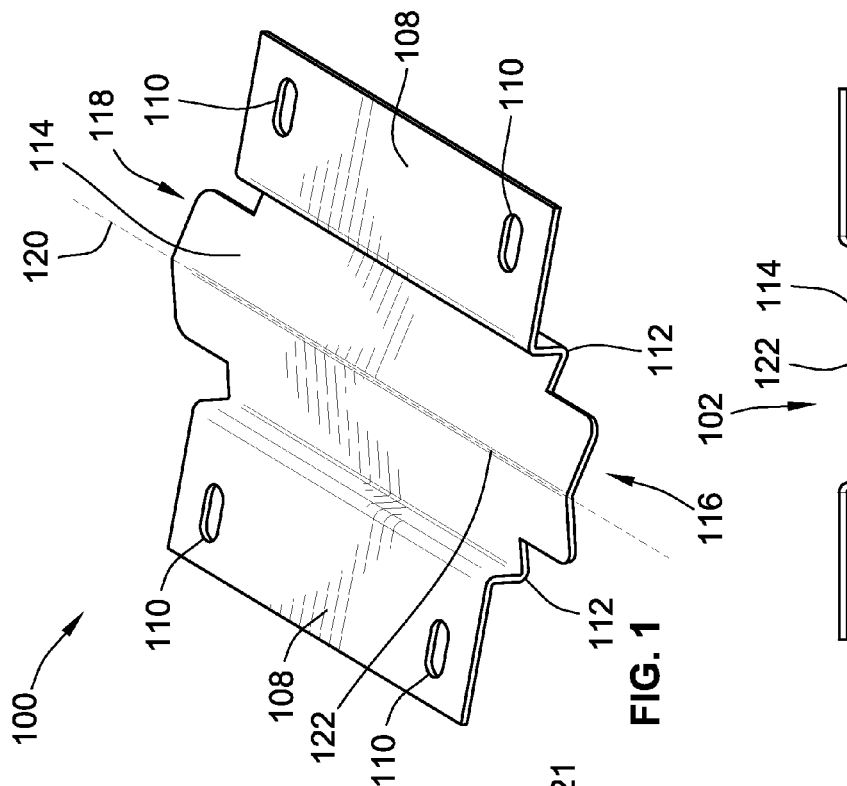
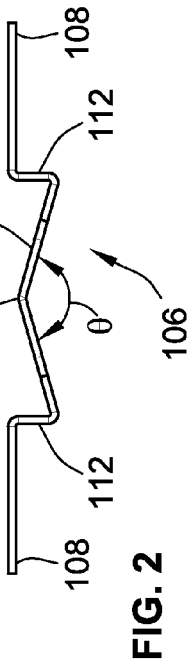
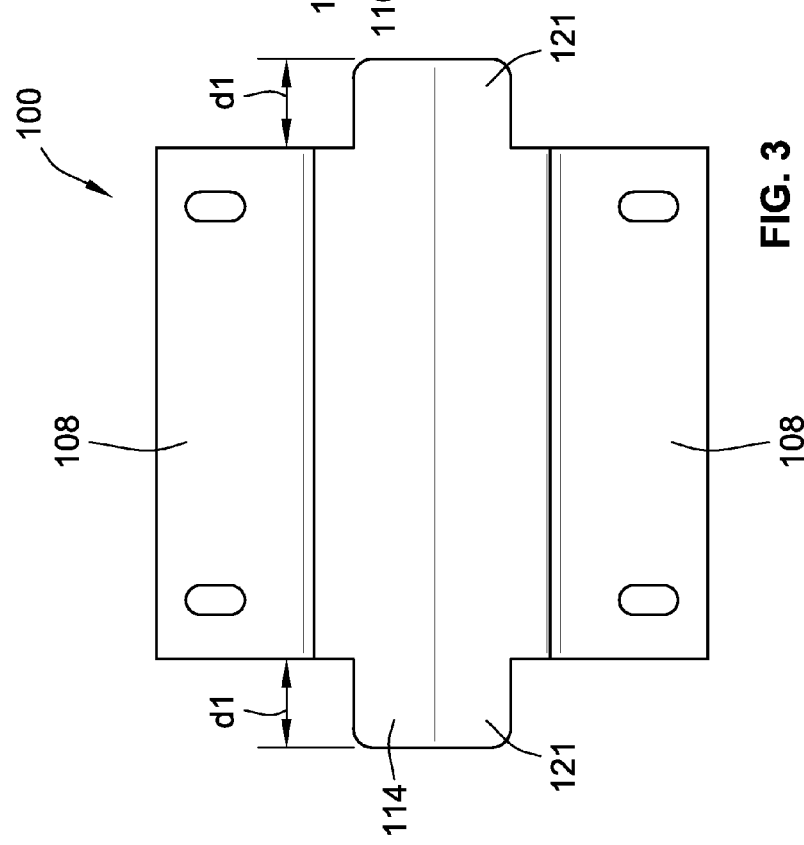
FIG. 1
FIG. 2
FIG. 3

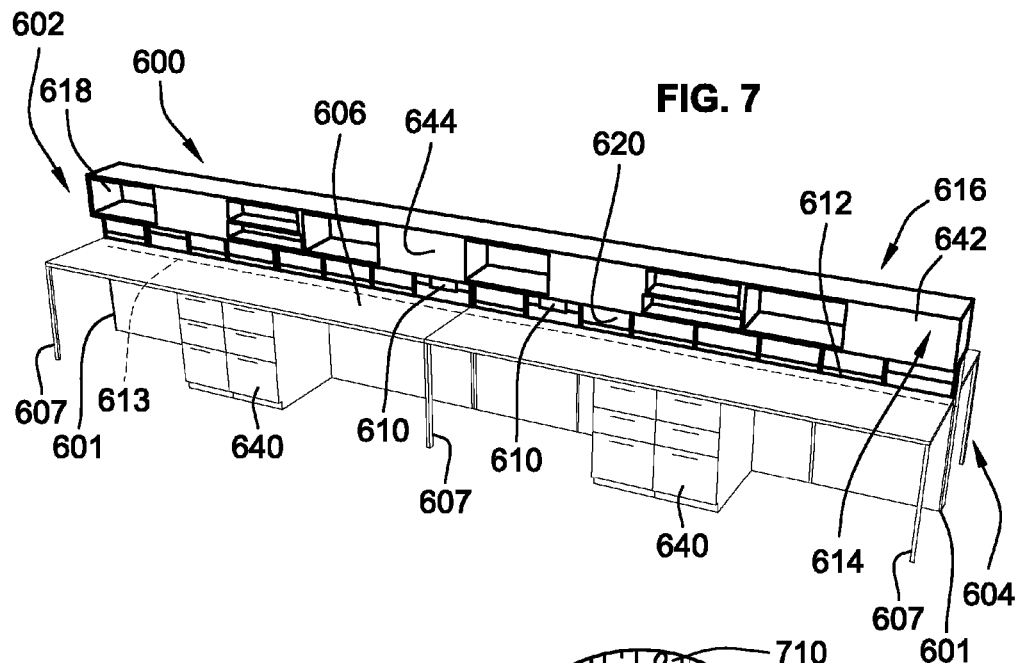
FIG. 7
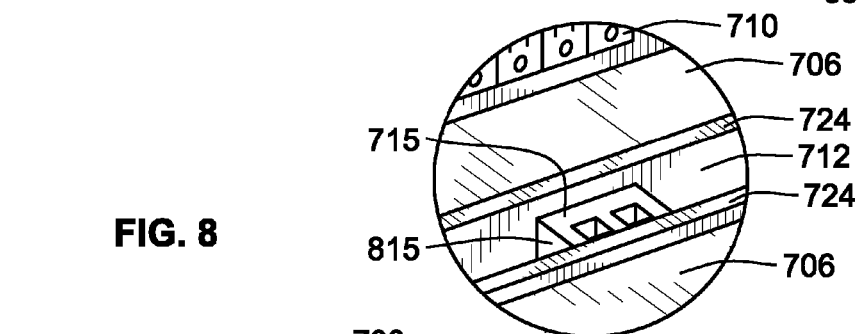
FIG. 8
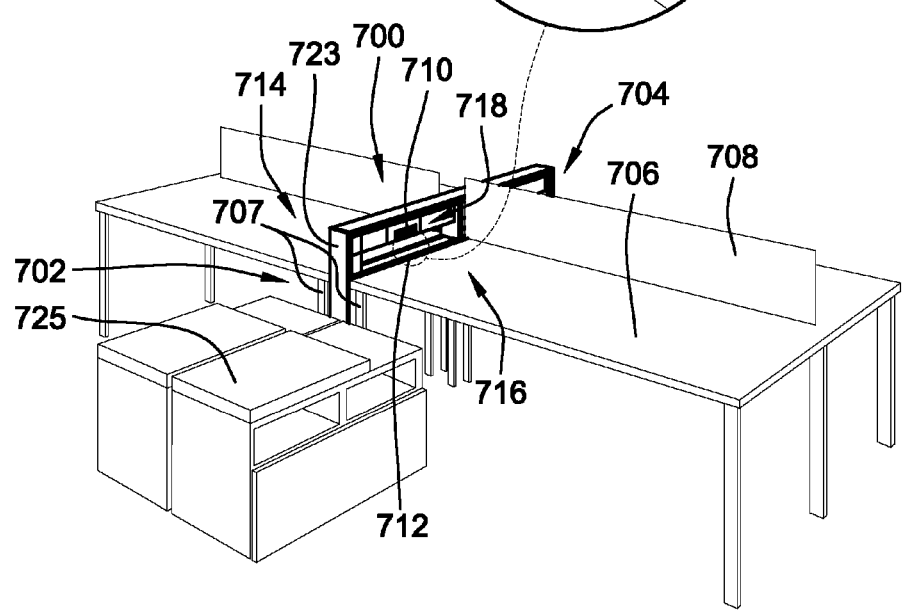

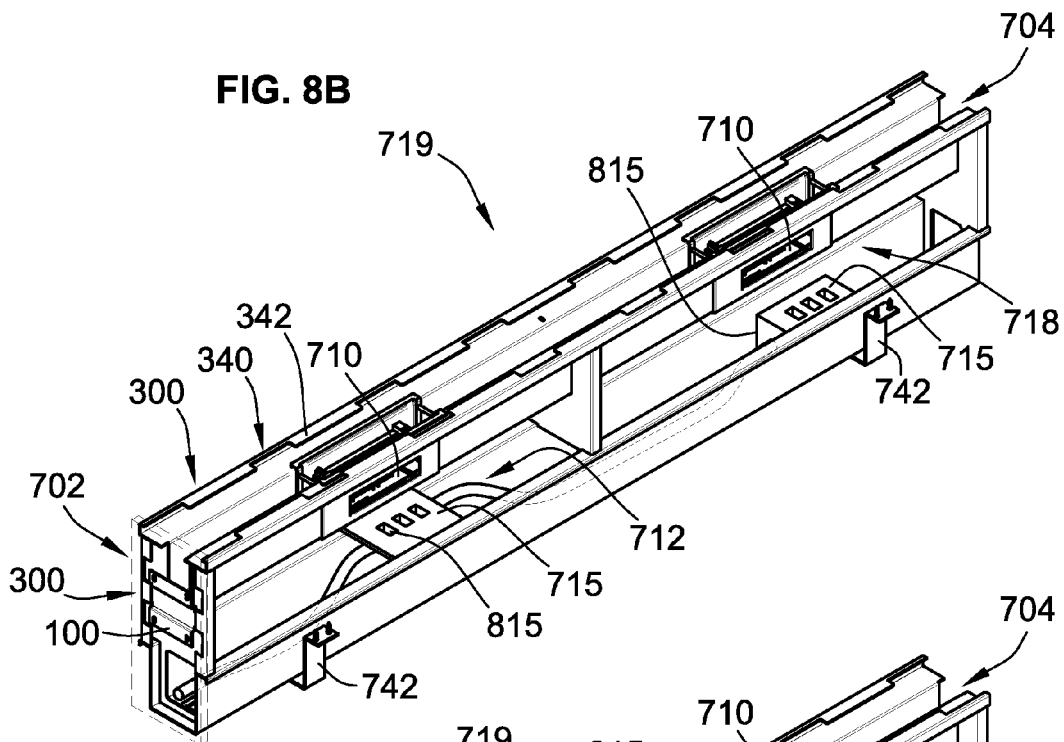
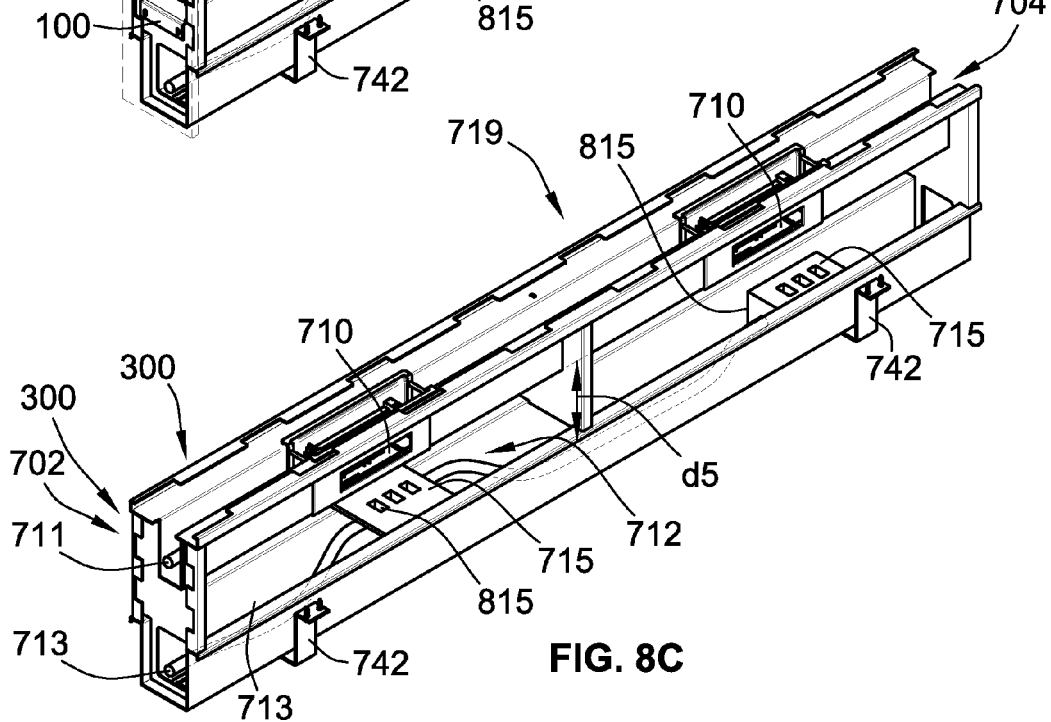

BRACKET FOR SECURING ITEMS OF FURNITURE WITHOUT TOOLS OR FASTENERS

CROSS-REFERENCE TO RELATED APPLICATION

This application claims the benefit of U.S. Provisional Patent Application Ser. No. 61/658,256, filed Jun. 11, 2012, entitled "Beltway System for Modular Furniture Assembly and Bracket," which is hereby incorporated by reference herein in its entirety.

FIELD OF THE INVENTION

Aspects of the present disclosure relate generally to brackets for assembling furniture, and, for example, to brackets for assembling furniture items that provide fast and convenient assembly and disassembly of a variety of furniture items.

BACKGROUND

Numerous methods and devices have been developed for connecting items of furniture together. Generally, items of furniture have been connected together via screws and nails, an assembly process that is time-consuming, dangerous, and can lead to permanently damaging the furniture and, potentially, the area surrounding the place of assembly. For example, shelves or cabinets with screws attached thereto may fall on the floor, causing the screws to bend and damage the floor. Moreover, the assembly and disassembly of the furniture items can take a long time, generally at least 30 minutes even for the simplest furniture configurations. One or more tools are required to fasten items of furniture together, increasing the install time and potential for incorrect assembly.

Various key-hole type furniture assembly systems have been developed as well. These systems do not generally require screws. However, these systems require that a person connecting the items of furniture, which can be very heavy, connect them very precisely. Even a smallest sideways movement of one of the items of furniture may interfere with the engaging (or disengaging) process and require the person to start the process over. Moreover, disengaging the items of furniture in such an arrangement is also very difficult. In order to disengage the items of furniture, these systems require that a person pushes one of the furniture pieces out of the keyhole, which requires a lot of strength and often leads to the furniture piece "falling back" into the keyhole and locking back into engagement, requiring the person to start the process again. This process is exacerbated even further as the number of screw heads required to be aligned increases. Additionally, these systems are unidirectional; in other words, they may be assembled or disassembled in only one direction (for example, if one end of an item of furniture abuts against a wall or another cabinet), so if the furniture is arranged such that assembly is possible in only one direction, the keyholes need to be oriented to permit assembly in that direction. If they are oriented the opposite way, assembly is not possible.

Some conventional systems generally have screws protruding out of the side that engages with the other engaging mechanism. In other words, the sharpest end of the connection is not protected. This means that if one of the furniture pieces were to fall to the floor, the screw would likely bend, effectively ruining the engaging mechanism and, moreover, the floor would be damaged. Additionally, conventional systems allow for only horizontal or vertical engagement of the furniture items, which makes their application limited.

A need exists for a system for providing power and data port access to office furniture, such as workstations or cubicles. Cables carrying power should be physically separated from cables carrying data to reduce the possibility of crosstalk or unwanted electromagnetic interference that can degrade data integrity.

These and other unfulfilled needs are addressed by the present disclosure.

SUMMARY OF THE INVENTION

Some aspects disclosed herein relate to a system for assembling a first and a second item of furniture. The system includes a bracket coupled to the first item, the bracket being configured to removably interengage with a frame coupled to the second item. The bracket includes a pair of co-planar extensions; a pair of supports each extending away at an angle from the extensions; and an elongated resilient bent middle section extending between the pair of supports. A bend of the bent middle section forms an apex located along and between the pair of supports. The bent middle section has a length dimension that is longer than a length dimension of each of the extensions such that end tab portions of the bent middle section extend beyond the supports. The frame includes a pair of rails, each rail having a recess and a flange. Each recess receives respective ones of the end tab portions. The flange is configured to receive respective ones of the end tab portions responsive to the bent middle section being urged from the recess into the flange to cause the bent middle section to deform into an interference fit engagement with the flange.

Another aspect disclosed herein relates to a furniture bracket assembly for connecting two furniture items. The assembly includes a substantially rectangular bracket coupled to a first furniture item. The bracket is configured to releasably interconnect via interference fit with a frame coupled to a second furniture item. The bracket includes a pair of co-planar wings; a pair of axial supports each extending at an angle from the wings; and an elongated middle section. The elongated middle section includes a first face facing the first furniture item and a second face opposing the first face. The first face has a convex shape and the second face has a concave shape. The elongated middle section has a length dimension that is longer than a length dimension of the wings, such that end tab portions of the middle section extend beyond the wings. The middle section is configured to slide into a hollow channel of the frame and be received by a pair of flanges situated on either side of the frame to interference fit the first face of the bracket to an internal side of each one of the pair of flanges. The internal side of the flange faces the second item of furniture.

Yet another aspect disclosed herein relates to a bracket for assembling a first and a second item of furniture. The bracket includes a pair of co-planar extensions; a pair of supports each extending away at an angle from the extensions; and an elongated resilient bent middle section extending between the pair of supports. A bend of the bent middle section forms an apex located along and between the pair of supports. The bent middle section has a length dimension that is longer than a length dimension of each of the extensions such that end tab portions of the bent middle section extend beyond the supports. The bracket is coupled to the first item of furniture and configured to removably interengage with a frame coupled to the second item of furniture.

Another aspect disclosed herein relates to a beltway system for a modular furniture assembly, configured to connect to two or more workstations. The beltway system includes a main body including a first end and a second end opposing the first end and a first side and a second side opposite the first side. The main body is configured to separate two or more workstations. The first side faces a first of the two or more workstations and the second side faces a second of the two or more workstations. The beltway system includes a data trough including a telecommunication port configured to provide a data connection to each one of the two or more workstations. The data trough has an upper lip that is above, below, or at the same level with a work surface of the two or more workstations. The data trough extends between the first end and the second end. The beltway system also includes at least one power block spatially separated a distance above the data trough. The power block includes a first power receptacle facing the first side and a second power receptacle facing the second side.

Another aspect disclosed hereto relates to a workstation system. The workstation system includes at least one desk separated into four or more workstations and including a beltway system connected thereto. The beltway system includes a first end and a second end opposing the first end; a first side and a second side; and a first power block coupled to the first end and a second power block coupled to the second end. The first and the second power block include a power receptacle coupled to the first side and a power receptacle coupled to the second side. The beltway system includes a data trough extending between the first end and the second end. The data trough includes two or more telecommunication ports configured to provide data to each one of the four or more workstations. The first and the second power block are spatially separated from the trough.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

FIG. 1 is a perspective view of a bracket for assembling furniture;

FIG. 2 is cross-sectional view of the bracket shown in FIG. 1;

FIG. 3 is a top view of the bracket shown in FIG. 1;

FIG. 7 is a perspective view of a floor-standing beltway assembly coupled to a set of workstations;

FIG. 8 is a perspective view of another embodiment of an add-on beltway assembly coupled to a set of workstations;

FIGS. 8A-8C are perspective views of the beltway system of FIG. 8;

Figure 4:
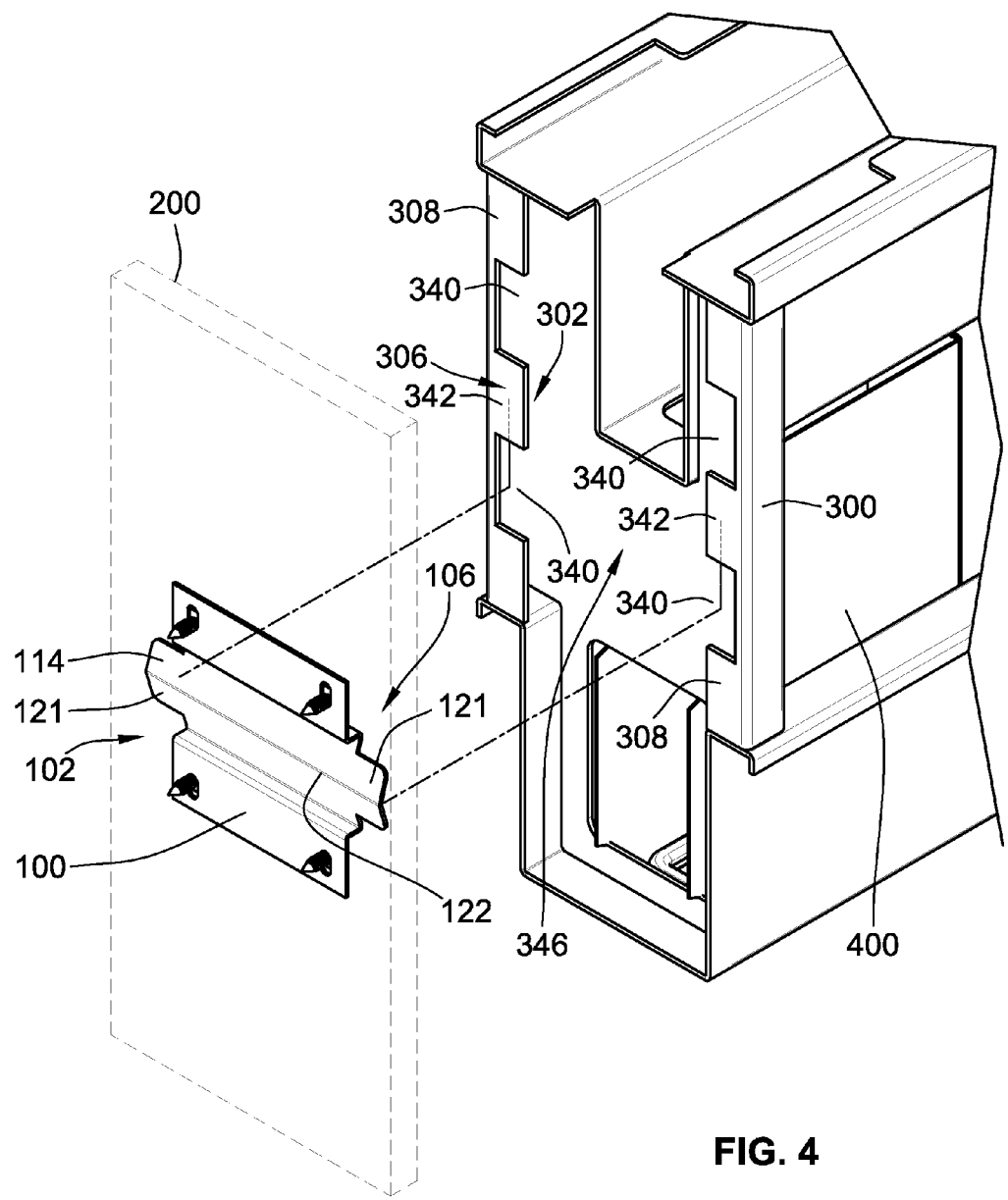
FIG. 4 is a perspective view of the bracket and frame prior to assembly.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 is a perspective view of a bracket 100 according to the present invention. The bracket 100 includes a first side 102 facing a first item of furniture 200 and a second side 106 which faces a frame 300 in a disassembled (unstressed) state as shown in FIG. 4. The bracket 100 includes two side wings or extensions 108 that are coupled (such as by fasteners) to the first item of furniture 200. Each one of the side extensions 108 includes a plurality of apertures or openings 110 formed therethrough configured to receive fasteners such as screws, bolts, nails, glue, or other fasteners for connecting the bracket 100 to the first item of furniture 200. Each one of the side extensions 108 includes two openings 110 formed therethrough. According to another aspect of the present disclosure, each one of the side extensions 108 includes a suitable number of apertures formed therethrough. The bracket 100 is coupled to the first item of furniture 200 via any acceptable means known to those of ordinary skill in the art.

The bracket 100 and the frame 300 (shown in FIG. 4) are composed of metal, such as steel having a suitable grade and thickness. According to another aspect of the present disclosure, the bracket 100 is constructed of any suitable material, including metal and metal alloys. According to another aspect of the present disclosure, the bracket 100 is constructed of aluminum or plastic-based material. In the illustrated examples shown in the drawings, the bracket 100 has a thickness of about 0.048 inches. The side extensions 108 have a width of about 1.00 inches. The side extensions 108 have a length of about 3.25 inches. For example, a ratio of the length to width of the side extensions 108 can be 3.25:1 or between 3 and 4 to 1. Although specific dimensions, tolerances, angles, and the like are disclosed herein, it should be readily apparent to a person of ordinary skill that other dimensions, tolerances, angles, and the like are contemplated. The thickness can be designed to support at least the maximum stress forces that will be applied to the bracket 100 when installed with an item of furniture relative to the frame 300.

The side extensions 108 are co-planar. The bracket 100 includes two axially (along a length dimension) extending supports 112. A major surface of each one of the supports 112 is disposed at an angle away from each one of the side extensions 108. The length of the supports 112 is the same as the length of the side extensions 108, and the width of the supports 112 in the illustrated example is about 0.206 inches. Each one of the axially extending supports 112 is disposed at an angle of about 90° relative to each one of the extensions 108, allowing the weight of the first item of furniture 200 to be fully supported by the supports 112 regardless of the weight of the first item of furniture 200. In this manner, the item of furniture 200 with the bracket 100 installed can rest (on a floor, for example,) on the bracket 100 (or brackets if multiple brackets are installed), without deforming the brackets 100, before the item of furniture 200 is installed relative to the frame 300. The supports 112 carry the force transmitted by the weight of the item of furniture 200, and act as "feet" for the item of furniture 200 without deforming the bracket 100. The total height of the bracket is about 0.318 inches, which includes the thickness of the bracket 100 and the width of the support 112. The term "about" can include a tolerance of +/−5-10%.

The bracket 100 includes a middle section 114. The middle section 114 includes a first end 116 and a second end 118 opposing the first end 116. The middle section 114 is elongated and has a length that is longer than the length of each one of the side extensions 108. The length of the middle section 114 along its central axis 120 is between about 4.375 inches. The middle section 114 includes a pair of tabs 121 on either end 116 and 118 of the middle section 114 as shown in FIG. 3. Each tab 121 extends by a distance $d_1$ beyond the length of the extensions 108. Each tab 121 is received by a corresponding (respective) recess 340 of the frame 300. Accordingly, once the bracket 100 is aligned with the frame 300, the right end tab 121 is aligned with the right recess 340 and the left end tab 121 is aligned with the left recess 340 as shown in FIG. 4. Distance $d_1$ is about 0.5625 inches in the illustrated example. Each of the supports 112 is disposed in the illustrated example at an angle of about 74.2° relative to each one of the middle section 114.

Figure 5:
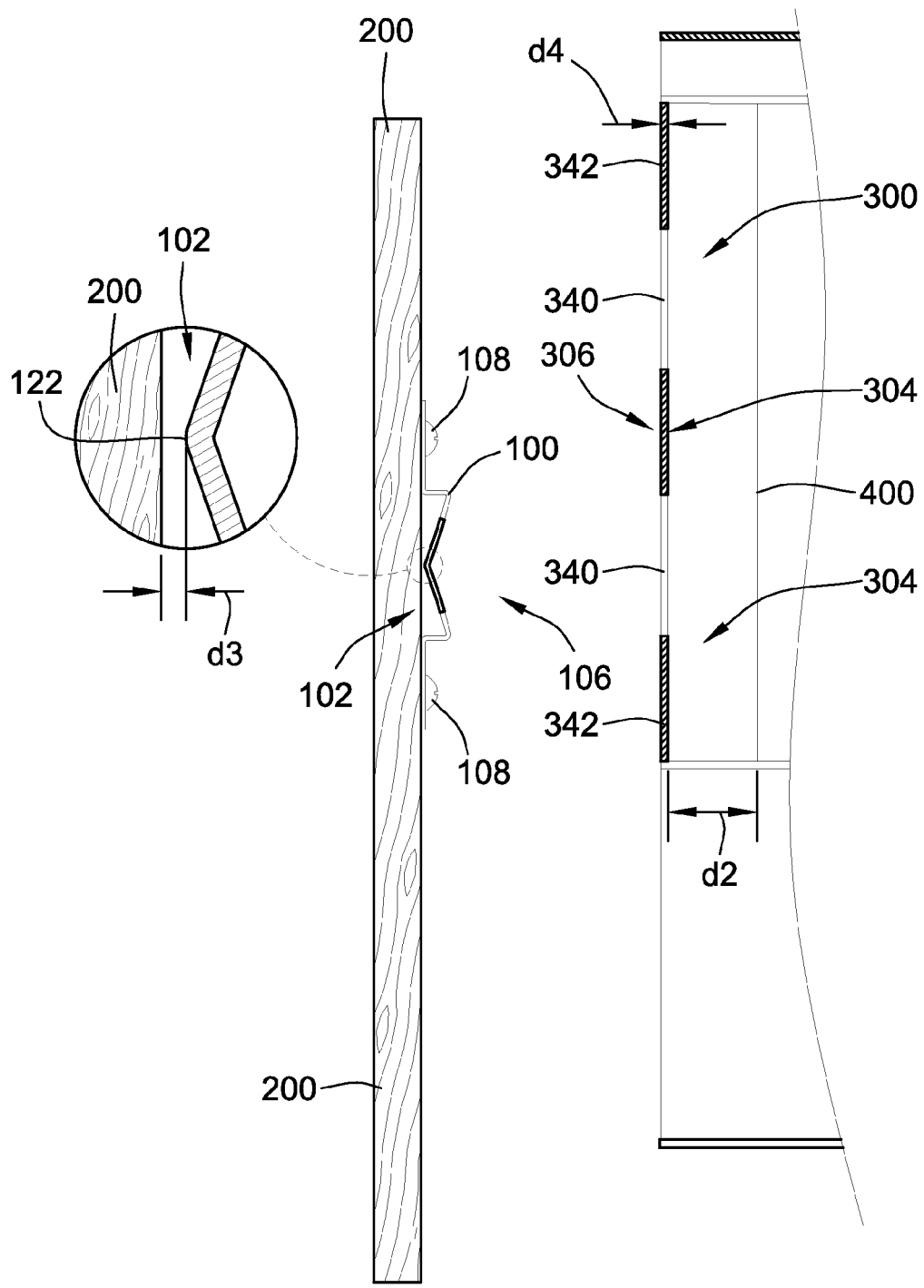
FIG. 5 is a cross-sectional view of the bracket and frame prior to assembly.

The middle section 114 has a bent cross-section, where the bend is along the central axis 120. The bent cross-section can be a v-shaped cross section as shown in FIGS. 1 and 2. In another aspect of the present disclosure, the shape of the middle section 114 at the first side 102 is convex and the shape of the middle section 114 at the second side 106 is concave. The middle section 114 has an apex 122 located along the central axis 120 between axial supports 112. The apex 122 of the middle section 114 is located proximate the first side 102. Referring now to FIG. 5, the apex 122 of the middle section 114 is located a distance $d_3$ away from the first item of furniture 200. The bend in the middle section 114 is defined by an angle θ. The angle θ is greater than about 120°. In the illustrated example, angle θ is about 148.36° when the bracket 100 is in a relaxed form, or, in other words, when the bracket 100 is not coupled to the frame 300. The bracket 100 is configured to work with a wide range of angles θ, such as between about 120 degrees and 160 degrees. In the illustrated example, distance $d_2$ is about 0.592 inches, but can be any dimension larger than the total height of the bracket 100, which in the illustrated example is 0.318 inches. Again, although specific dimensions and angles are shown in the illustrated examples, those of ordinary skill in the art will appreciate that other dimensions and angles can be used to achieve the advantages and objects of aspects of the present disclosure.

Figure 6C:
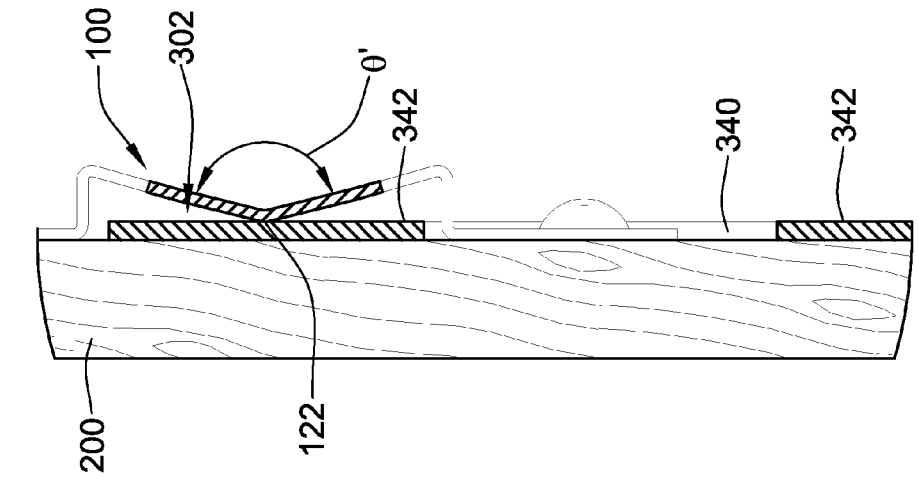
FIGS. 6A-6C are cross-sectional views of the steps of engagement of the bracket and the frame.
Figure 6B:
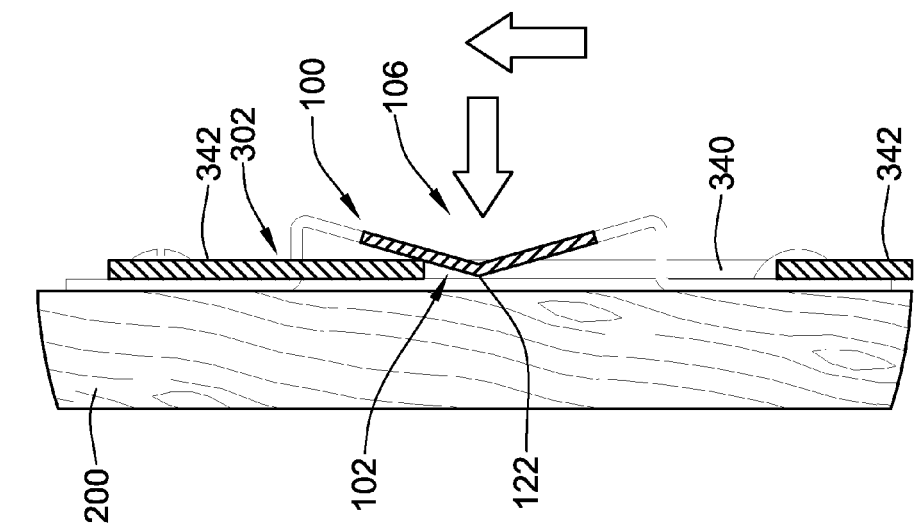
Figure 6A:
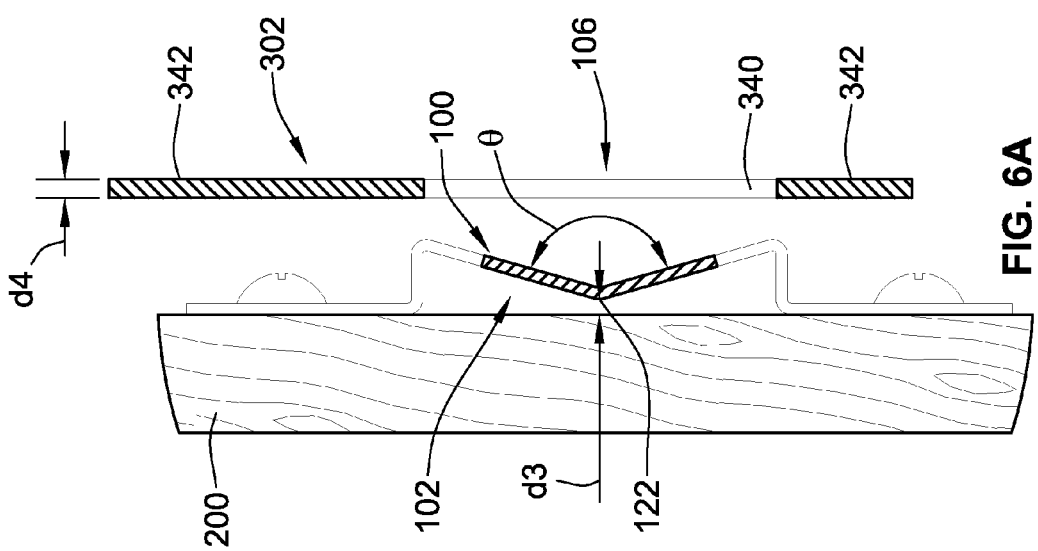

FIG. 4 is a perspective view showing the bracket 100 coupled to the first item of furniture 200 prior to assembly with the frame 300 coupled to a second item of furniture 400. The first item of furniture 200 and the second item of furniture 400 are independently selected from drawers, cladding, storage compartments, including overhead storage compartments, shelves, desks, cabinets, mirrors, bulletin or tack boards, bookcases, doors, furniture panels, office furniture, and any other furniture. The bracket 100 is coupled to the first item of furniture 200 at the first side 102. In a disassembled or unstressed state, the second side 106 of the bracket 100 faces the frame 300. The frame 300 includes a first (internal) side 302 that faces the second item of furniture 400 and a second side 306 that faces the bracket 100 in the disassembled or unstressed state. The frame 300 includes a pair of rails 308 and a plurality of recesses or recesses 340 forming a channel 346 between the frame 300 and the second item of furniture 400. Each frame includes a plurality of recesses 340 configured to receive the middle section 114 as shown in FIGS. 6A-6C. In another aspect of the present disclosure, the frame 300 can include two, four, six, eight, or any other number of recesses 340 configured to receive the middle section 114. The frame 300 includes a plurality of flanges 342. The first side 302 of the flanges 342 is configured to engage with the first side 102 of the bracket 100. The distances between the flanges 342 are slightly larger than the length of the extensions 108 to accommodate the extensions 108. Correspondingly, the distances between the recesses 340 are slightly larger than total length of bracket 100 including middle section 114.

The end tabs 121 of the bracket 100 slide into the recesses 340 and are then urged to move along the channel 346 to engage by interference fit with the first side 302 of the flanges 342. The first side 102 of the flanges is urged inside the channel 346 and behind the flanges 342 such that the first side 102 of the end tabs 121 compresses against the first side 302 of the flanges 342 to form an interference fit. The apex 122 of the end tabs 121 contacts the first side 302 of the flanges 342, causing the middle section 114 to deform into an interference fit (or friction or pressure fit) with the flange 342. In an assembled or compressed state, the apex 122 compresses against the first side 302 of the flanges 342. Distance $d_2$ is the width of the channel 346, which is the distance between the first side 302 of the flange 342 to the second item of furniture 400. The distance $d_2$ is about 0.592 inches.

Deformation of the middle section 114 of the bracket 100 can occur gradually during engagement (and disengagement) of the furniture, which allows the force required to engage and disengage the furniture to be distributed more evenly. In turn, this allows the user to more easily control the engagement and disengagement process. Accordingly, the assembly and disassembly of the furniture is a smooth operation requiring less force from the user compared to conventional assemblies. Moreover, the assembly and disassembly process is faster and easier and can be completed in as little as a minute or less. The assembly and disassembly of even heavier items of furniture such as large cabinets can even be performed by a single user.

Referring now to FIG. 5, to assemble the two items of furniture 200 and 400 together, the user aligns the end tabs 121 of the middle section 114 with the recesses 340. The end tabs 121 of the middle section 114 are configured to fit into the recesses 340. Once the end tabs 121 of the middle section 114 are placed into the recesses 340, the user slides the bracket 100 in a desired direction of engagement along the channel 346. In FIG. 5, the user slides the bracket 100 upwards to engage the first item of furniture 200 with the second item of furniture 400, such that the first item of furniture 200 and the second item of furniture 400 are fully aligned. According to other aspects of the present disclosure, the user slides the bracket 100 in any desired direction to achieve a desired configuration of the first item of furniture 200 relative to the second item of furniture 400. The direction is generally up, down, to the left, or to the right, but other directions of engagement, such as along the diagonal may also be achieved with the bracket 100 and the frame 300 according to the present invention. Hanging arrangements, i.e., where the first item of furniture 200 hangs down from the second item of furniture 400 are also achieved with the bracket 100 and frame 300 according to the present disclosure. Advantageously, the bracket 100 can be installed in two different directions. For example, if an item of furniture to be installed will abut against a wall or other immovable structure, the item of furniture to be installed can be slid toward the wall. If the recesses 340 are spaced apart along the entire length of the channel 346, the starting position of the bracket 100 can be in any of those recesses and then the item of furniture to be installed can be slid in either direction along the central axis 120. Because the bracket 100 is symmetrical, it is not required to install the bracket 100 in a particular orientation.

Referring now to FIGS. 6A-6C, the user aligns the middle section 114 of the bracket 100 with a pair of recesses 340 of the frame 300. The user then places the middle section 114 into the channel 346. The dimensions of the recess 340 and the channel 346 are configured to receive the middle section 114. Once the middle section 114 is received in a pair of recesses 340, the user moves the bracket 100 along the channel 346 in a desired direction to achieve the desired configuration of the first 200 and the second 400 items of furniture. The frame 300 may be configured in such a way as to engage with the bracket 100 in any desired orientation. If there are multiple brackets 100 fastened to the item of furniture 200, the user aligns the middle sections 114 of each of the brackets 100 with the corresponding pairs of recesses 340 of the frame 300.

When the bracket 100 is moved along the channel 346 towards a pair of flanges 342 of the frame 300, the apex 122 of the middle section 114 engages with the first (interior) side 302 of the pair of flanges 342. Once the apex 122 touches or contacts the first side 302, a user will encounter resistance in moving the bracket 100 further along the channel 346. The end tabs 121 can be rounded or tapered to ease their entrance underneath the flanges 342. The end tabs 121 can also be bent slightly downwards away from the extensions 108 to further ease their entrance underneath the flanges 342. As shown in FIG. 6A, the apex 122 of the bracket 100 is located a distance $d_3$ away from the first furniture item 200 in a disassembled or unstressed state. The thickness $d_4$ of the flange 342 is larger than the distance $d_3$. According to one aspect of the present disclosure, $d_3 \leq \frac{1}{2} d_4$. The frame 300 can include a plurality of equally spaced recesses 340 and flanges 342 along most or all of the length of the frame 300. In the illustrated example, $d_4$ is about 0.079 inches. The distance $d_3$ is about 0.065 inches in the illustrated example.

The engagement of the bracket 100 and the frame 300 is achieved by sliding the apex 122 of the middle section 114 of the bracket 100 behind the first side 302 of the flange 342. This causes the flange 342 to contact the apex 122 at one side and the first furniture item 200 at a second side. When the flange 342 is urged between the apex 122 and the first furniture item 200, the middle section 114 is deformed into an interference fit with the flange 342. Prior to assembly, an angle θ in the illustrated example has a value of about 148.36° as discussed above. Once the bracket 100 and the frame 300 are interengaged (assembled), an angle θ' defines the middle section 114. The angle θ' is slightly greater than θ. Thus, the angle θ defining the middle section 114 springs down and increases during engagement. In turn, this causes the sloped sides defining the middle section 114 to flatten out or deflect towards the second end 106. In other words, the angle defining the middle section 114 increases slightly during interengagement. The difference between the higher thickness of $d_4$ as compared to the distance $d_3$ between the apex 122 and the first item of furniture 200 in a disassembled or unstressed state causes the angle θ defining the middle section 114 to be compressed against the first side 302 of the flange 342 causing the angle θ to increase to θ'. The angle θ' in the illustrated example is about 149.5 degrees, or alternately, about 1-5% larger than the angle θ (which in the illustrated example is about 148.36 degrees). The middle section 114 is resilient and configured to give way for the pair of flanges 342 to fit between the apex 122 and the first item of furniture 200. The amount of interference between the apex 122 and the first side 302 of the flange 342 can be determined by one of ordinary skill in the art based on the thickness $d_4$ of the frame 300 and the type or industrial grade of material of which the bracket 100 and the frame 300 are composed.

The user is advantageously provided with tactile feedback when the bracket 100 and the frame 300 are engaged or disengaged. The interference fit between the bracket 100 and the frame 300 prevents inadvertent disengagement. The design of the bracket 100 and the frame 300 makes it difficult to move the bracket 100 further in a direction of engagement once the bracket 100 and the frame 300 are engaged. Moreover, the bracket 100 is designed in such a way that during disassembly, inadvertent re-assembly is prevented. Thus, once the disassembly process is initiated by the user, the bracket 100 easily slides out from the interengagement with the frame 300 preventing any inadvertent re-assembly with the frame 300. The user will tactilely feel a vibration or the sensation of two metal objects rubbing against one another as the bracket 100 engages with the frame 300. As the user continues to push the item of furniture to which the bracket 100 is attached into the frame 300, a greater resistance will be felt until the items of furniture are aligned in their installed position. Conversely, when disengaging the bracket 100 from the frame 300, the user will tactilely feel a resistance until the bracket "pops out" of the frame 300 into the recesses 340 and then suddenly the tactile sensation will go away, alerting the user that the item of furniture 200 can now be disengaged from the frame 300.

In conventional systems, inadvertent re-assembly or falling back of the furniture pieces during disassembly is a constant problem. What is more, the bracket 100 and the frame 300 are configured in such a way that the assembly and disassembly processes do not have to be precise. In other words, there is no need to precisely fit the bracket 100 to the frame 300 for assembly. The end tabs 121 easily fit into the recesses 340 and then into the channel 346 and behind the flanges 342. This eliminates the issue encountered in conventional systems of the need for finding a precise contact point where the bracket 100 and the frame 300 lock and unlock. The bracket 100 and the frame 300 are configured in such a way that the user knows right away when the bracket 100 and the frame 300 are unlocked during disassembly as it becomes very easy to move the bracket 100 once the bracket 100 and the frame 300 are unlocked. As stated above, the dimensions of the recesses 340 can be slightly larger than the end tabs 121 to be as forgiving as the designer wishes to be in aligning the bracket 100 into the recesses 340.

Just like assembly, the disassembly of the bracket 100 and the frame 300 is omnidirectional. The bracket 100 and the frame 300 do not have to be disassembled in a reverse direction from the way the bracket 100 and the frame 300 were assembled. This makes the bracket 100 and the frame 300 particularly useful in assembling very heavy items. The heavy items may be assembled in the direction where the assembly is easier—for example by sliding the bracket 100 down into the frame 300. In order to disassemble the heavy items, the bracket 100 and the frame may be disassembled by also sliding the bracket 100 further down out of interengagement with the frame 300. In conventional systems the user would have been required to move the heavy item back up to disassemble the system in the opposite direction of assembly. This, along with other issues, made it very difficult, if not impossible, to disassemble heavy items by just one person. In addition, in conventional systems, the weight of the furniture item would pull the item back down into engagement, making disassembly even more difficult and time consuming.

The assembly and disassembly of the bracket 100 and the frame 300 does not require any tools or screws and can be carried out by just one user once the bracket 100 is positioned in the recesses 340. In order to assemble the bracket 100 and the frame 300, the user merely fits the middle section 114 into a set of recesses 340 and slides the bracket 100 along the channel 346, such that the apex 122 contacts the first side 302 of the pair of flanges 342. The bracket 100 and the frame 300 can be assembled and disassembled multiple times, without damaging the bracket 100 or the frame 300. Following disassembly, the middle section 114, including the angle θ, returns to its original pre-assembly (in an unstressed state) value.

A critical point of the bracket 100—the apex 122—is shielded from impact in case of an inadvertent dropping of the bracket 100. Thus, even if the bracket 100 falls to the ground, the apex 122 will not deflect or get damaged. As mentioned above, the supports 112 support the weight of the item of furniture 200, protecting the raised middle section 114 from damage.

In another aspect of the present disclosure, an item of furniture is connected to two or more brackets 100. The frame 300 includes two or more channels defined by two or more pairs of recesses, like the recesses 340, and two or more pairs of flanges, like the flanges 342. A user aligns the first bracket with a first channel (defined by a first pair of recesses, like the recesses 340) and the second bracket with a second channel (defined by a second pair of recesses, like the recesses 340). A user then moves the item of furniture in a desired direction of engagement. The two brackets simultaneously engage the two frames. In other words, the middle section 114 of the bracket and the second bracket is simultaneously received in the channels of the frame 300 and simultaneously urged to engage with internal sides of the flanges. The middle sections 114 of the bracket and the second bracket simultaneously deform to form an interference fit with the frame 300.

The bracket 100 and the frame 300 are configured in such a way that they can be used with any existing furniture items. All that is required is that a bracket 100 be fastened or otherwise attached to the first furniture item 200 and the frame 300 be fastened or otherwise attached to the second furniture item 400. This aspect is particularly useful in locations needing additional space, such as a cabinet or other storage place, as the bracket 100 and the frame 300 make it very easy to add such additional space to existing systems.

Referring now to FIG. 7, a floor-standing beltway system 600 is shown. The beltway 600 is a self-supporting wall unit, supported by a pair of vertical supports 601 and a horizontal support 603, extending between a first end 602 and a second end 604 of the beltway 600, thereby forming a "wall" to which desk stations, workstations, tables, work surfaces, or the like can be attached. The horizontal support 603 can rest on a floor of a building in which the beltway system 600 is installed. A middle vertical support 605 can optionally be provided and includes the frame 300 as described herein. A set of workstations 606 is connected to the beltway 600 by any known means of connecting sets of workstations together. The set of workstations 606 can be connected to the beltway 600 via a bracket or via any suitable connection or coupling method or mechanism. In another aspect of the present disclosure, the set of workstations 606 can be connected to the beltway 600 by being screwed or bolted directly to the beltway 600. The beltway 600 is positioned along the long (length) dimension of the set of workstations 606. The beltway 600 runs all the way across the long dimension of the set of workstations 606; in other words, the first end 602 of the beltway 600 is flush with the respective end of the set of workstations 606. Similarly, the second end 604 of the beltway 600 is flush with the respective end of the set of workstations 606. According to another aspect of the present disclosure, the beltway 600 can be shorter or longer than the length dimension of the set of workstations 606 along which the beltway system 600 is positioned. It should be emphasized that the beltway system 600 is a freestanding unit and forms a structural support, like a wall structure, for the set of workstations 606 attached to the beltway system 600. In other words, the beltway system 600 can form a structural support for the set of workstations 606. In an example, the set of workstations 606 are not self-supporting—they require attachment to the beltway system 600 to remain upright in a workable position. For example, the set of workstations 606 can have only one pair of legs each, requiring the edge of the workstation that lacks any legs to be attached to the beltway system 600 for support.

Figure 7A:
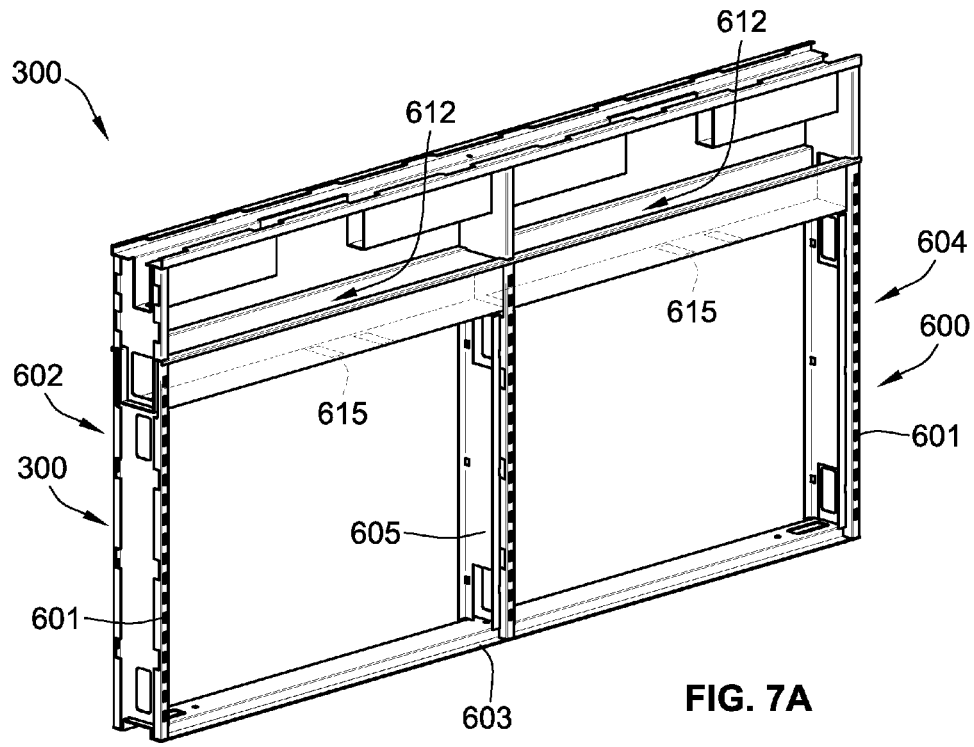
FIG. 7A is another view of the beltway assembly of FIG. 6.
Figure 8A:
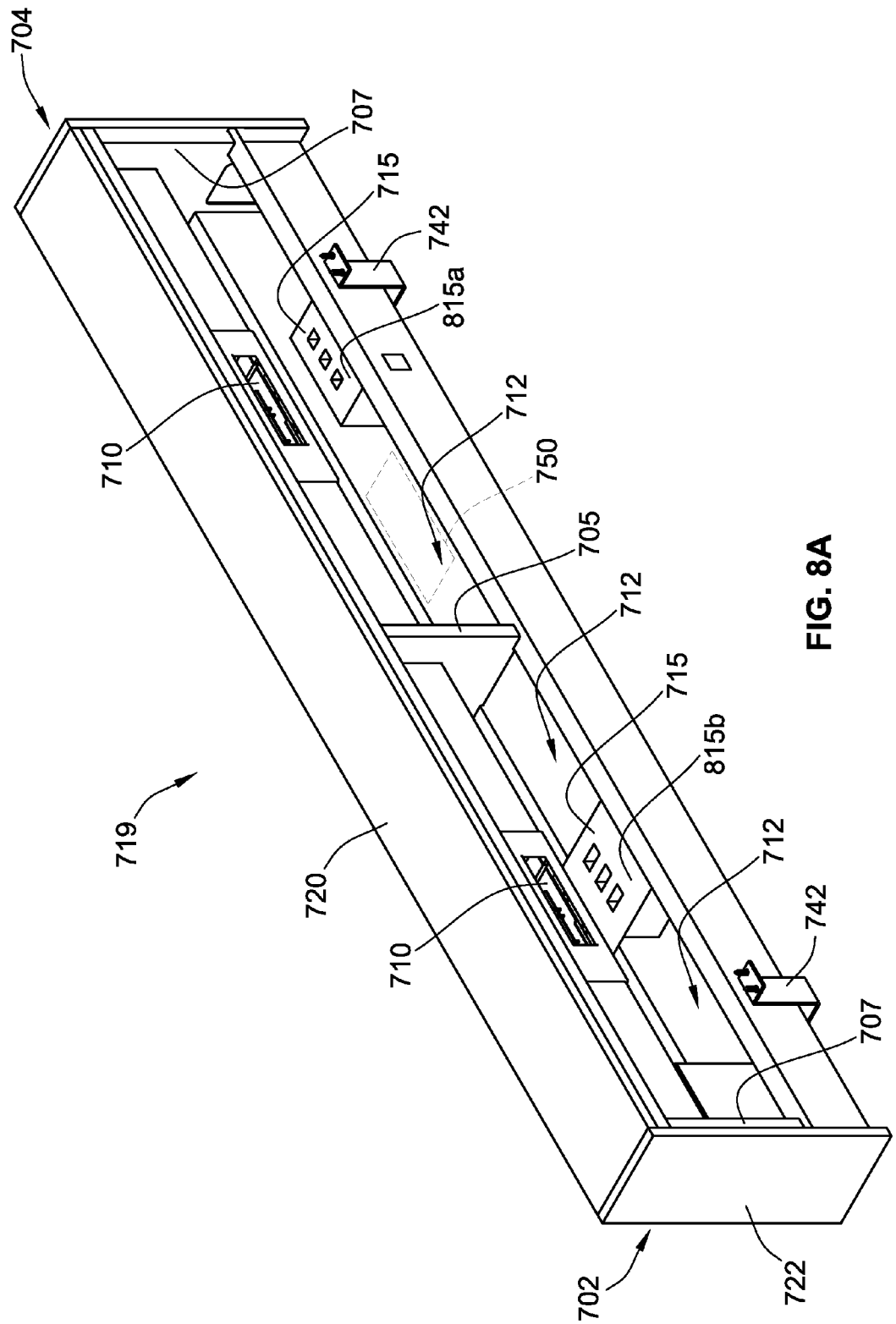

The beltway system 600 has a first side 614 and a second side 616. The beltway system 600 includes power blocks 610 configured to provide access to users at the first side 614 and the second side 616. The beltway system 600 also includes a data trough 612 including data lines 613 running therethrough. Referring now to FIG. 7A, a telecommunications plate 615 is included in the data trough 612. Data lines 613 run to the telecommunications plate 615. The telecommunications plate 615 can be flush with a top of the data trough 612 or mounted into a bottom of the data trough 612. The telecommunications plate 615 is configured to support an Ethernet, audio, video (including HDMI and VGA), USB, IEEE 1394 data connection, or any combination thereof, to the set of workstations 606. Access to the power blocks 610 and the data trough 612 can be covered with removable doors 620 to enhance physical appearance of the beltway system 600. The doors 620 can slide axially up and down to open and close access to the data trough 612 and the power blocks 610. The doors 620 may open in any known manner including by hinging upwards to open or opening to the right or left side. Conduits to the power blocks 610 are physically separated from data lines 613 located in the trough 612. A power block 610 includes a housing that houses one or more power outlets or receptacles 611, such as shown in FIG. 8E. The beltway system 600 includes an opening dimensioned to receive the housing of the power block 610 such that the power outlets or receptacles 611 are accessible to receive corresponding power plugs from electronic equipment such as lights, computers, telephones, and the like that are present at a workstation. Whether the data trough 612 is openly accessible from a top thereof or accessible through a removable or hinged door 620, 750 (see FIG. 8A), it should be emphasized that the data ports in the plate 615 are accessible from the top of the data trough 612 such that a cable for the data port can be plugged in or unplugged from the open top of the data trough 612. In other words, other than an optional hinged or removable door, there is no structure on the top of the data trough 612 that impedes the ability to plug or unplug cables to data ports available in the plate 615. As the word connotes, the term "trough" indicates that the data trough 612 is open on the top and forms a trough or channel into which data cables can be plugged into or unplugged from corresponding data ports accessible from one or more plates 615.

The beltway system 600 can optionally feature an overhead storage section 642, which is structurally supported by the supports 601, 605, which means that none of the weight of the overhead storage section 642 needs to be supported by any of the workstations 606. The overhead storage section 642 can include a variety of cabinets, shelves, and other spaces for storing items. The storage section 642 is connected to the beltway system 600 via bracket 100 and frame 300 arrangement discussed above. The storage section 642 is coupled to the bracket 100 or a plurality of brackets 100. The beltway system 600 includes a frame 300 coupled to its top portion. In another aspect of the present disclosure, the storage section 642 is connected to the beltway system 600 via any known methods.

The beltway system 600 includes a cut out 618 on the first side 614 and the second side 616 of the beltway 600. The cutout 618 includes a partition separating a section that can be accessed from the first side 614 from the section that may be accessed from the second side 616. According to another aspect of the present disclosure, the cutout 618 can be a pass-through that forms a window between the first side 614 and the second side 616 of FIG. 7. Thus, a user on the first side 614 can see a user on the second side 616 through the cutout or pass-through 618.

Figure 7B:
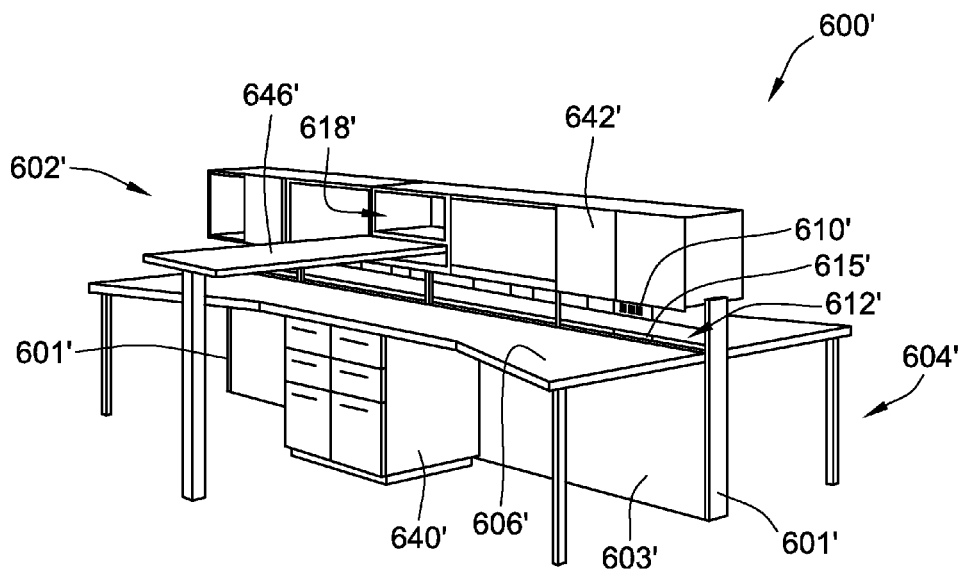
FIG. 7B is another embodiment of a beltway assembly coupled to a set of workstations.

Referring now to FIG. 7B, another aspect of a beltway system 600' according to the present disclosure is shown. The beltway 600' is a free-standing wall unit supported by a pair of vertical supports 601' and a horizontal support 603' positioned between a first end 602' and a second end 604'. The horizontal support 603' rests on a floor or a ground surface. A set of workstations 606' is connected to the beltway system 600' via any methods and arrangements known to those of ordinary skill in the art. The beltway system includes one or more power blocks 610' configured to provide power access to users of the set of workstations 606'. The beltway system 600' also includes a data trough 612' like the data trough 612 described above located underneath the power block 610'. The data trough 612' includes a telecommunication plate 615 configured to provide access to data to users of the set of workstations 606'.

The beltway system 600' and/or the set of workstations 606' are coupled to drawers or cabinets 640' positioned underneath the set of workstations 606'. In one aspect of the present disclosure, the drawers 640' are connected directly to the set of workstations 606' via a bracket 100 and frame 300 arrangement or via any other connection method. In another aspect of the present invention, the drawers 640' are connected directly to the beltway system 600' via bracket 100 and frame 300 arrangement or via any other connection method.

The beltway system 600' and/or the set of workstations 606' are coupled to overhead storage compartments 642'. The storage compartments 642' can be connected directly to the beltway system 600', directly to the set of workstations 606', or to both the beltway system 600' and the set of workstations 606'. The storage compartments 642' include a cutout 618'. The cutout 618' is configured to provide additional storage to users of the set of workstations 606'. A raised table 646' can pass through the cutout 618' to provide additional workspace to the users of the workstations 618'. The beltway system 600' and/or the set of workstations 606' can be connected to other furniture elements.

The illustrated beltway 600 and 600' are free standing or standalone wall units having dimensions exemplified by but not limited to 48"W×5"D×28"H; 60"W×5"D×28"H; and 72"W×5"D×28"H. The standalone beltway units 600 and 600' are structural and do not need to be mounted on or supported by any other surface. The standalone beltway units 600 and 600' may be placed directly onto the floor or a ground surface such that the horizontal support 603, 603' rests on the floor or ground surface. The vertical supports 601 and 601' and the horizontal support 603 and 603' support the full weight of the beltway systems 600 and 600', respectively. The dimensions of the beltway systems 600, 600' are configured such that workstation tables can be oriented in a portrait (FIG. 8) or landscape (FIG. 7) orientation relative to the beltway systems 600, 600', using the same beltway system 600, 600'. For such systems, the length to width ratio of the tables is 2:1. In either the portrait or landscape configurations, no part of the workstation tables extends beyond the longest dimension of the beltway system 600, 600'.

The set of workstations 606 can also include desktop task LED lights and/or under surface LED task lights at each workstation, powered by the power block 610, for example. Referring now to FIG. 7, a set of workstations 606 can also include drawers 640 with sliding doors coupled to an underside surface of the set of workstations 606. The drawers 640 can be coupled to the underside surface via the bracket 100 and frame 300 arrangement discussed above. The drawers 640 can also be coupled to the underside surface via any other known means. The illustrated drawers 640 can have varying dimensions exemplified by but not limited to 15¼"W×24", 30", or 36"D. The drawers 640 may also have a depth of 36". The set of workstations 506 can also include additional storage tower options. The set of workstations 606 can also include overhead shared access modules with hinged doors, additional height upper storage, and cabinets.

FIG. 8 illustrates a beltway system 700 including a first end 702 and a second end 704 opposing the first end. The beltway system 700 is coupled to a set of workstations 706 in a "portrait" orientation (two workstation tables abut either side of the beltway system 700). The set of workstations includes several workstations 706 that are used by several individuals. The set of workstations 706 includes four workstations (including four corresponding tables or desk surfaces) configured to be used by four individuals. In another aspect of the present disclosure, the set of workstations 706 may include two, six, eight, or any other suitable number of workstations. The beltway system 706 serves as a divider between the workstations. Each aspect of the beltway system 700 is equally accessible from each individual workstation of the set of workstations 706 as will be discussed in further detail below.

The beltway system 700 is connected to a set of workstations 706 and, unlike the beltway system 600, 600', is not a free standing unit. The beltway system 700 is structurally supported by another structure, such as a set of workstations 706. The beltway system 700 may be supported by any existing set of workstations. In other words, an existing set of workstations may be retrofitted with the beltway system 700. In this way, the beltway system 700 can be referred to as an "add-on" unit, which can be added to an existing set of workstations that provide the structural supporting system for the beltway system 700. In other words, unlike the floor-standing beltway systems 600, 600' described in connection with FIGS. 7, 7A, and 7B, the beltway system 700 does not provide the primary structural support for any of the workstations 706. According to one aspect of the present disclosure, the illustrated beltway system 700 is attached to an underside of a set of workstations and can have dimensions exemplified by but not limited to 24"W×5"D×9"H; 30"W×5"D×9"H; 36"W×5"D×9"H; 42"W×5"D×9"H; 48"W×5"D×9"H; 60"W×5"D×9"H, and 72"W×5"D×9"H. The beltway system 700 is attached to an underside of the set of workstations by any known means, including by screwing the beltway 700 to the underside of the set of workstations via the bracket 742. The beltways 600, 600' and 700 can be composed of metal, including steel, or plastic, wood, laminate, acrylic, or any other suitable material.

The set of workstations 706 also includes a partition or privacy panel 708 positioned roughly perpendicularly to the beltway system 700. The partition 708 can be made of sheer, semi-sheer, or opaque material and is configured to provide physical separation and privacy to individuals using the set of workstations 706. The partition 708 can be constructed of any suitable material, including plastic, wood, metal, glass, acrylic, laminate, and other materials. The dimensions of the partition 708 can vary depending on the dimensions of the set of workstations 706. The dimensions of the partition 708 as illustrated can be exemplified by 24"W×3/16"D×12"H; 30"W×3/16"D×12"H; 36"W×3/16"D×12"H; 42"W×3/16"D×12"H; 48"W×3/16"D×12"H; 54"W×3/16"D×12"H; 60"W×3/16"D×12"H; and 66"W×3/16"D×12"H. According to another aspect of the present disclosure, the depth (D) of the partition 708 can be ½". The partition 708 may also have customized dimensions based on customer needs. The partition 708 can be installed at any existing workstation or set of workstations 706. The partition 708 includes attachment brackets, such as the brackets 100, for attaching the partition 708 to an existing workstation.

As seen in FIG. 8, the combination of the beltway system 700 and the partition 708 makes each workstation physically and visually separated from other workstations. The beltway system 700 can be arranged in a portrait arrangement—across the set of workstations 706 as shown in FIG. 8. According to another aspect of the present disclosure, the beltway system 700 may be arranged in a landscape arrangement—with the beltway 700 rotated 90° from the arrangement shown in FIG. 8. In other words, the beltway 700 can be positioned along a narrow dimension (width) or along a long dimension (length) of a set of workstations 706. The partition 708 can include computer monitors coupled thereto to maximize the amount of workspace available at each workstation. The set of workstations 706 can also include, at each workstation, monitor accessories, including flat panel posts, flat panel arm, grommet attachments, clamp attachments, pneumatic monitor arms and posts, slatwall attachments, cladding, and other accessories. The set of workstations 706 can also include, at each workstation, central processing unit (CPU) slings.

The beltway system 700 includes one or more power blocks 710 configured to provide power access to each workstation. The power blocks 710 are connected via a conduit, such as conduit 711 shown in FIG. 8C, to a power source. The beltway system 700 also includes a data trough 712 configured to provide a data connection to each workstation. The data trough 712 includes data cables 713 running to a telecommunications plate or plates 715 as shown in FIGS. 8A-8C. The data cables 713 are physically separated from the power conduits 711 and are not housed within the power conduits 711. The data connections can be positioned in the bottom of the data trough 712 or flush with a top surface of the data trough 712. When positioned in the bottom of the data trough 712, the data connectors 717 can be received in the data trough 712 out of the way to keep the desktop area clutter- and cable-free. FIG. 8E is a view shown from the opposite side of the view shown in FIG. 8A. FIG. 8E shows two data port assemblies 815a, 815b. The data port assembly 815b may be movable and is moved closer to the data port assembly 815a in FIG. 8E. The data port assembly 815a (including data ports such as USB, Firewire, audio/video, Ethernet, HDMI, or the like) is provided in the bottom of the data trough 712, and the data connector 717 is plugged into a data port of the data port assembly 815a. The data port assembly 815a may include a sliding or hinged door 750 that is configured to fully or partially cover the data port assembly 815a. A user may slide or open the door in a desired direction to gain full access to the data port assembly 815a. Excess cable to the data connector 717 can be neatly folded and retained inside the data trough 712 out of the way of the working surface of the workstation (removed for clarity in FIG. 8E). Likewise, a power cable 719 connecting a power plug 721 to a power outlet or receptacle 611 of the power block 710 can be folded and retained in the data trough 712. The other data port assembly 815b is shown as being flush with a top of the data trough 712. For ease of discussion, the data port assemblies 815a,b are shown in two different positions relative to the data trough 712, though it is contemplated that all data port assemblies 815 in the data trough 712 are positioned in the same part of the data trough 712 (either all in or near the bottom of the data trough 712 or flush with a top of the data trough 712). Of course, the data port assemblies 815 can also be positioned anywhere within the data trough 712, so long as they do not exceed the height of the data trough 712 and impinge into the area of the pass-through 618. The object is to keep the power and data cables and connectors separated from one another.

Like the data trough 612, the data trough 712 is openly accessible from a top thereof or accessible through a removable or hinged door 750 (see FIG. 8A). It should be emphasized that the data ports in the plate 715, like the plate 615, are accessible from the top of the data trough 712 such that a cable for the data port can be plugged in or unplugged from the open top of the data trough 712. In other words, other than an optional hinged or removable door 750, there is no structure on the top of the data trough 712 that impedes the ability to plug or unplug cables to data ports available in the plate 715.

The telecommunications plate 715 can provide an Ethernet, audio, video (including HDMI and VGA), USB, IEEE 1394 (Firewire) data connection through respective data ports or plugs, or any combination thereof to each workstation. Each telecommunication plate 715 includes one or more data ports assemblies 815. The data port assemblies 815 may include ports or connectors that are square, rectangular, or of any desired shape. According to another aspect of the present disclosure, the data trough may include blank telecommunication plates 715 that lack data ports, and a customer can select the specific data port assemblies 815 (that include one or more connectors for any combination of one or more data connections listed above) that the customer wishes to include in the telecommunication plate 715. As seen in FIG. 8C, the data trough 712 is spatially separated from the power block 710 by a distance $d_5$. Distance $d_5$ is between about 1 to about 5 inches. According to another aspect of the present disclosure, the distance $d_5$ can be any suitable distance that provides a physical separation (such as an air separation) between the data trough 712 and the power block 710. In the illustration shown in FIG. 8E, the pass-through 618 provides the physical separation between the power block 710 and the data port assembly 815a, b. The power conduit to the power block 710 is located axially above the data trough 712. The power conduit or power lines 711 are hidden within a top section of the main body of the beltway system 700. The power conduit 711 to the power block 710 and the data lines passing within the data trough 712 are physically separated to eliminate interference, cross talk, and other issues traditionally associated with data and power lines being run together. The beltway system 700 also provides for visual separation of the conduit to the power block 710 and the data lines within the data trough 712, providing visual confirmation to customers and users alike that the power and data lines (within the beltway) and cables (exterior to the beltway and plugged into the power plugs/data ports) do not cross and are kept separate. Many other routing configurations are possible besides the examples shown in the drawings, but the illustrations are intended to show how the power and data lines can be routed in a manner that they are separated from one another, both when they are received at the beltway and then through the corresponding power outlets/data ports accessible from the beltway. In an non-limiting aspect, while the data lines and power lines may intersect once or twice, they do not run next to each other in close proximity or touching one another for any distance.

The power blocks 710 include a first side 714 and a second side 716. The power blocks 710 include a power plate at the first side 714 and another power plate at the second side 716. Thus, users of workstations at the first side 714 and the second side 716 can conveniently plug into a power source at their respective side of the workstation. The power blocks 710 include one or more (such as two or four) power outlets or receptacles 611, such as shown in FIG. 8E. Each beltway system 700 can include multiple power blocks 710 separated from one another by a distance. The beltway system 700 shown in FIG. 8 includes two power blocks 710—a first power block 710 coupled to the first end 702 and a second power block 710 (not shown) coupled to the second end 704. The beltway system 700 is configured to be used by four individuals. Each workstation of the set of workstations 706 can include a rectangular work surface. Each work surface can have different dimensions based on customer specifications. Each work surface can have a width of 36, 42, 48, 60, or 72" and a depth of 24, 30 or 36". Each beltway system 700 can have a varying number of power blocks 710, all being connected to the same power source. Generally, each power block 710 provides power to at least two individual workstations, but in some aspects each power block 710 can provide power to a single workstation. The power block 710 can be positioned in such a way as to provide power to more than two individual workstations.

Figure 8D:
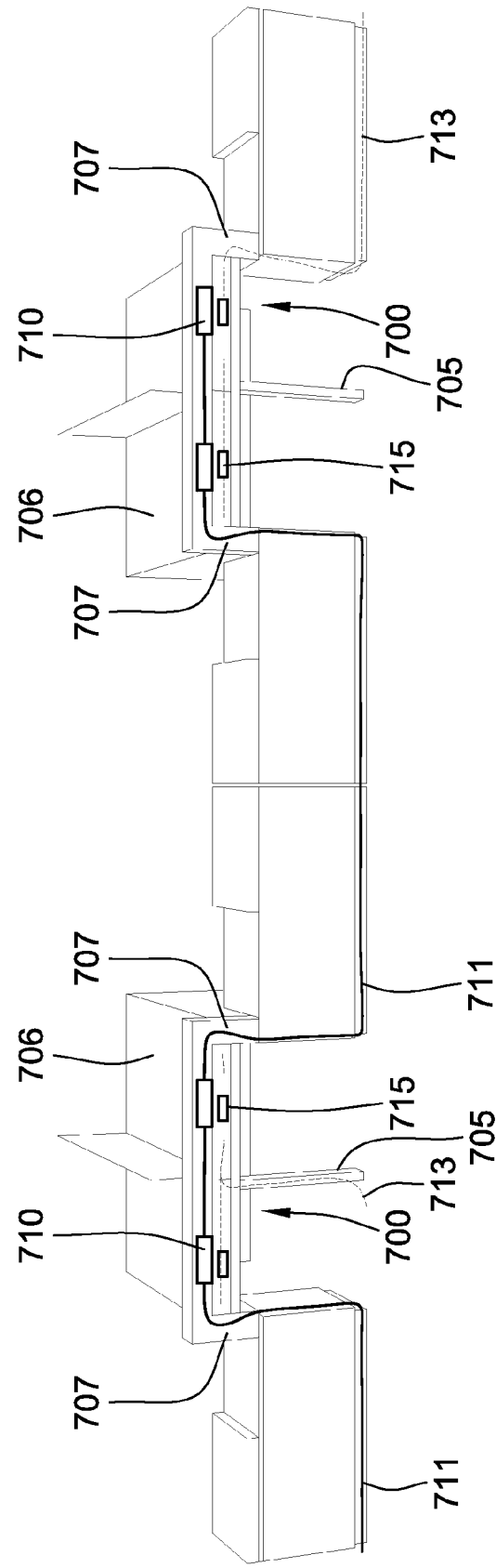
FIG. 8D is a perspective view of two beltway systems and a power line running between them.
Figure 8E:
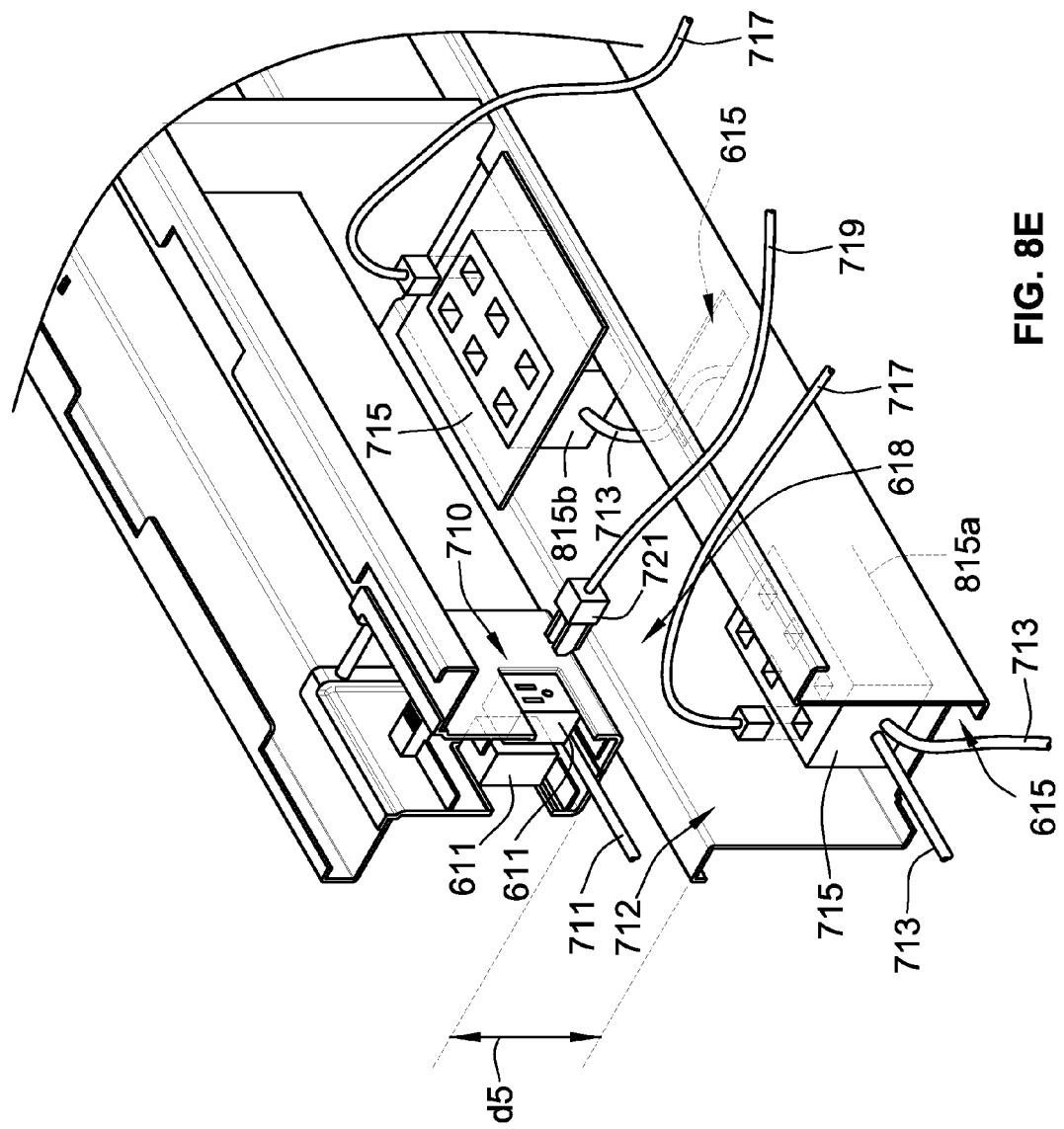
FIG. 8E is a perspective view of an example beltway system having a power block and two data port assemblies, one flush with the top of a data trough and one in the bottom of the data trough.

Referring now to FIG. 8D, an alternative arrangement of two beltway systems 700 is shown. Each beltway system 700 provides power and data access to two workstations, although additional workstations can be supplied by each beltway system. Power lines run from the wall of a room underneath the floor surface to the vertical supports (legs) 707 (also shown in FIG. 8A) of each set of workstations 706. The power conduit 711 then runs from the vertical supports 707 through each power block 710. The beltway system 700 also includes a non-supporting leg 723 extending to a drawer or set of drawers 725. The drawer or set of drawers 725 can be any type of furniture instead. Both beltway systems 700 of FIG. 8D are powered by a single common power source. According to another aspect of the present disclosure, a plurality of sets of workstations 706 can be equipped with a plurality of beltway systems 700, wherein all the beltway systems 700 share a single common power source for all the power blocks 710.

The data lines 713 for the data ports in the telecommunication plates 715 can be routed through the middle support 705 (like the vertical support 605 shown in FIG. 7A) of the frame 300 or through a leg (not shown) of the workstation 706, or through the vertical support 707 of the frame 300 as shown on the right side of FIG. 8D. This routing keeps the data lines separated from the power lines before they are brought to the data ports/power outlets in the beltway system. When routed through the middle support 705, the data lines can be connected to data ports in the floor or on an adjacent wall. Likewise, when routed through the vertical support 707, the data lines can be connected to data ports in the adjacent wall. This is particularly useful for existing configurations in which the data ports have already been installed within an office space and cannot be readily relocated or repositioned.

The beltway system 700 includes a pass-through 718 that passes through a width of the beltway. The pass-through 718 is an opening creating an open window between the workstation at the first side 714 and the workstation at the second side 716, and physically separates the power blocks 710 from telecommunication plates 715 located within or flush with a top of the data trough. The pass-through 718 is an open cutout in the beltway system 700. According to another aspect of the present disclosure, the beltway system 700 does not include a pass-through 718, or includes a pass-through 718 that is composed of glass or other sheer or semi-sheer material. The pass-through 718 provides additional visual confirmation to customers and users that power conduits and data lines are physically separated, and also allows a power or data cable from one side 714, 716 to be accessible from the other side 716, 714 if a power plug or data port is unavailable on the other side.

The data trough 712 includes a pair of ribs or lips 724 on either side of the data trough 712. The pair of ribs or lips 724 is positioned on top of the work surface as shown in FIG. 8. According to another aspect of the present disclosure, the ribs or lips 724 can be flush with a top of the work surface or the ribs or lips 724 can be positioned below the work surface. The data trough 712 includes a substantially hollow opening. Data cables, such as data cables 713 of FIG. 8C, run through the substantially hollow opening of the data trough 712. Additionally, users can place any hanging cords or cables into the data trough 712 to achieve a cleaner and more organized work station appearance. The data trough 712 can include a removable cover for closing access to the data trough, wherein the cover only allows cables, such as data cables, to pass therethrough.

In FIG. 8A, the beltway system 700 includes at its top side 719 a cladding panel 720. The beltway system 700 includes cladding panels 722 at its first end 702 and at its second end 704. The cladding panel 722 is coupled to the beltway system via bracket 100 and frame 300 discussed above. The beltway system 700 includes a frame 300 along or coupled to its top section 719. The frame 300 includes a plurality of alternating recesses 340 and flanges 342 for receiving the bracket 100. The beltway system 700 can include a variety of furniture components coupled to its top section 719, including a storage assembly 642 shown in FIG. 8.

The beltway systems 600, 600', and 700 allow for an almost infinite variety of different configurations of furniture. As discussed above, the beltway systems 500, 600, 700 are configured in such a way that they can be coupled to a set of workstations in any configuration or spatial arrangement. The beltway systems 600, 600', and 700 provide easy access to power and data to each user of each individual work station. The beltway systems 600, 600', and 700 eliminate the need to use loose cable extension cords and power extension cords by providing data and power access directly at each work station. Moreover, the beltway systems 600, 600', and 700 can be directly coupled, via the frame 300 and bracket 100, to any items of furniture, including desks, cabinets, doors, drawers, etc. Moreover, the beltway systems 600, 600', and 700 are configurable to include any desired number of power outlets and telecommunication ports.

The beltway systems 600, 600', and 700 can be installed at any existing work station post production. Thus, if a customer has been using cables and extension cords to provide data and power access to workstations, the customer may purchase the beltway systems 600, 600', or 700 and provide easy access to power and data to each work station. Thus, existing systems can be easily retrofitted with the beltway systems 600, 600' and 700 and with the brackets 100 and frames 300 described above.

The brackets can be installed along any two sides or on the top of the beltway system. Frames like the frame 300 can be arranged on the two sides and the top of the beltway (see FIG. 7A, for example), and optionally along a middle vertical support 605, with flanges and recesses spaced regularly along the lengths of each of the sides, top, and optional support 605. Any item of furniture with one or more brackets fastened to its underside can be attached to any side, support, or top of the beltway, allowing nearly an infinite number of configurations and combinations of furniture items including workstations. The power and data ports are physically separated by pass-throughs in the beltway, to reduce installation error and to mitigate the effects of electromagnetic interference generated by the power lines and cables interfering with the integrity of data signals passing through the data lines or cables. The data trough conceals the data ports and allows cables and other items to be stored within the trough out of sight and off the working surface of the workstation. The beltway is position and orientation agnostic in the sense that it does not matter which orientation the beltway is positioned. Both sides of the beltway can be mirror images of one another, making orientation irrelevant and for ease of manufacturing and assembly. The lines carrying the power (typically in conduit) and data signals to the beltway can be routed in a way that conceals them from the users when seated at the workstations and in a manner that segregates the two lines from one another to reduce crosstalk and EMI effects. This also simplifies the installation of the beltway and reduces the chance that power and data lines will be connected incorrectly.

In combination with the bracket as described herein, the versatility of the beltway system is further enhanced. The bracket also functions as "feet" for the item of furniture to which the bracket is attached. The vertical supports of the bracket protect the bent middle section from damage and carry the weight of the item of furniture when resting on a surface, such as the floor. The vertical supports are orthogonal to the bottom surface of the item of furniture to which the bracket is attached, ensuring that the mass of the item will be maximally supported by the vertical supports. The bracket or brackets can be fastened to the underside of an item of furniture, and the item can rest on the bracket(s) while awaiting assembly into a frame of a beltway without damaging the bracket, the item of furniture, or the surface upon which the bracket rests. The interference fit created by the bent middle section and flanges of the frame provide tactile feedback to the user, do not require the use of any tools or fasteners to secure the two items of furniture to one another, and minimize the chance of "overshooting" the target position of the two items of furniture relative to one another. Conversely, when disassembling two items of furniture coupled together with the brackets as disclosed herein, the tactile feedback will produce a sudden "popping out" sensation as the bracket is freed from the flanges and enters the recesses where the bracket can be removed from the frame. Unlike keyhole arrangements, the brackets allow omnidirectional installation and disassembly of two items of furniture relative to one another. For example, installation can be proceed from right to left, while disassembly can proceed from left to right. When an item of furniture abuts against a wall or other immovable structure, the mirror image of the bracket and beltway do not require that they be installed in any particular orientation. In keyhole arrangements, care must be taken to orient the "keyhole" such that the item to be installed can be slid into the open part of the keyhole.

The bent middle section of the bracket forms a kind of leaf spring that compresses against the flange when installed into the frame. This interference fit is sufficient to secure two items of furniture to each other, regardless of their weight (for heavier items, more brackets can be used to increase the holding force between the brackets and the frame), without requiring any tools or fasteners between the bracket and the frame. The only force needed is to push one item of furniture relative to the other until the bracket engages the flange (either partially or completely). It is not required that the bracket completely engage the flange—even a partial engagement will suffice to secure two items of furniture together, particularly when installed on the top of the frame. This allows leeway in designing the dimensions of the flanges and recesses and the bracket sizes, because the bracket does not have to completely fit under a flange. The tabs on the ends of the brackets help to guide the bracket underneath the flanges. When installed under an item of furniture, installation proceeds in a "blind" manner in that the installer may not be able to see the brackets, particularly for top-mounting items of furniture. The tabs help to guide the bracket under the flanges without requiring the installer to look or use fingers (which can get pinched) to find the flanges. The operator guides the item of furniture against the frame, and even if they are not perfectly aligned, the operator simply needs to move the item of furniture (with the bracket) until it pops into the recesses and then slide the item of furniture into an interference fit with the frame of the other item of furniture or beltway (which is itself an item of furniture as used herein).

While particular embodiments and applications of the present disclosure have been illustrated and described, it is to be understood that this disclosure is not limited to the precise construction and compositions disclosed herein and that various modifications, changes, and variations can be apparent from the foregoing descriptions without departing from the scope of the invention as defined in the appended claims.

What is claimed is:

1. A system comprising:
    a frame; and
    a bracket coupled to a first item, the bracket being configured to removably interengage with the frame coupled to a second item, the bracket including:
        a pair of co-planar extensions;
        a pair of supports each extending away at an angle from the extensions; and
        an elongated resilient bent middle section extending between the pair of supports, such that a bend of the bent middle section forms an apex located along and between the pair of supports, the bent middle section having a length dimension that is longer than a length dimension of each of the extensions such that end tab portions of the bent middle section extend beyond the supports;
    the frame including a pair of rails, each rail having a recess and a flange, wherein each recess receives respective ones of the end tab portions, and wherein the flange is configured to receive respective ones of the end tab portions responsive to the bent middle section being urged from the recess into the flange to cause the bent middle section to deform into an interference fit engagement with the flange.

2. The system of claim 1, wherein the bent middle section is v-shaped.

3. The system of claim 1, wherein the bent middle section is defined by an angle of at least about 120° in an unstressed state.

4. The system of claim 1, wherein the angle defining the bent middle section in a compressed state is larger than the angle defining the bent middle section in an unstressed state.

5. The system of claim 1, wherein the pair of supports are disposed at a 90° angle relative to the pair of co-planar extensions.

6. The system of claim 1, wherein a distance between the apex of the bent middle section is less than a thickness of the frame.

7. The system of claim 6, wherein the distance between the apex of the bent middle section is less than or equal to one half of the thickness of the frame.

8. The system of claim 1, wherein the bent middle section is defined by two sloped sides, wherein the two sloped sides deform outwardly towards the second item of furniture when the bracket and the frame are interengaged.

9. The system of claim 1, wherein the interference fit is achieved without using any fasteners between the frame and the bracket.

10. The system of claim 1, wherein each one of the pair of co-planar extensions includes a plurality of openings formed therethrough for receiving a plurality of fasteners for fastening the bracket to the first item of furniture.

11. The system of claim 1, wherein the bracket and the frame interengage via an interference fit.

12. The system of claim 1, wherein the bent middle section includes a convex side, the convex side being configured to contact an underside of each flange when the bracket and the frame are interengaged.

13. The system of claim 1, wherein the apex is located approximately half way between the pair of supports in an unstressed state.

14. The system of claim 1, wherein the end tab portions of the bent middle section compress against the respective flanges.

15. The system of claim 1, wherein the system provides tactile feedback to a user during assembly and disassembly.

16. The system of claim 1, being configured to be assembled or disassembled in a plurality of different directions.

17. The system of claim 1, wherein an angle defining the bent middle section is configured to return to its unstressed value following disassembly.

18. The system of claim 1, wherein the bracket and the frame are constructed of a material composed of metal, metal alloys, or plastic-based material.

19. The system of claim 1, further comprising a second bracket identical to the bracket, the bracket and the second bracket both being coupled to the first item, the bracket and the second bracket being configured to removably simultaneously interengage with the frame, such that a respective flange of the frame is configured to receive a respective one of the end tab portions responsive to the bent middle section of the bracket and the second bracket being urged from a respective channel into the respective flange to cause the bent middle section to deform into the interference fit engagement with the respective flange.

20. The system of claim 1, further comprising a plurality of alternating flanges and channels.

21. A furniture bracket assembly for connecting two furniture items, comprising:
a substantially rectangular bracket configured to releasably interconnect via interference fit with a frame, the bracket including:
a pair of co-planar wings;
a pair of axial supports each extending at an angle from the wings; and
an elongated middle section, including a first face and a second face opposing the first face, wherein the first face has a convex shape and the second face has a concave shape, the elongated middle section having a length dimension that is longer than a length dimension of the wings, such that end tab portions of the middle section extend beyond the wings,
wherein the middle section is configured to slide into a hollow channel of the frame and be received by a pair of flanges situated on either side of the frame to interference fit the first face of the bracket to an internal side of each one of the pair of flanges.

22. The assembly of claim 21, wherein the bracket and the frame are configured to be engaged and disengaged relative to one another without the use of any tools.

23. The assembly of claim 21, wherein the frame includes two or more hollow channels, each one of the two or more hollow channels being configured to receive the middle section.

24. The assembly of claim 21, wherein the middle section is v-shaped.

25. The assembly of claim 21, wherein the bracket is devoid of any sharp protruding surfaces that may damage a floor or other surface in case of a fall, and wherein a weight of the first furniture item is supported by the pair of axial supports of the bracket.

* * * * *